(No Model.) 2 Sheets—Sheet 1.
T. L. McKEEN.
COUPLING FOR LOCOMOTIVES.
No. 491,903. Patented Feb. 14, 1893.
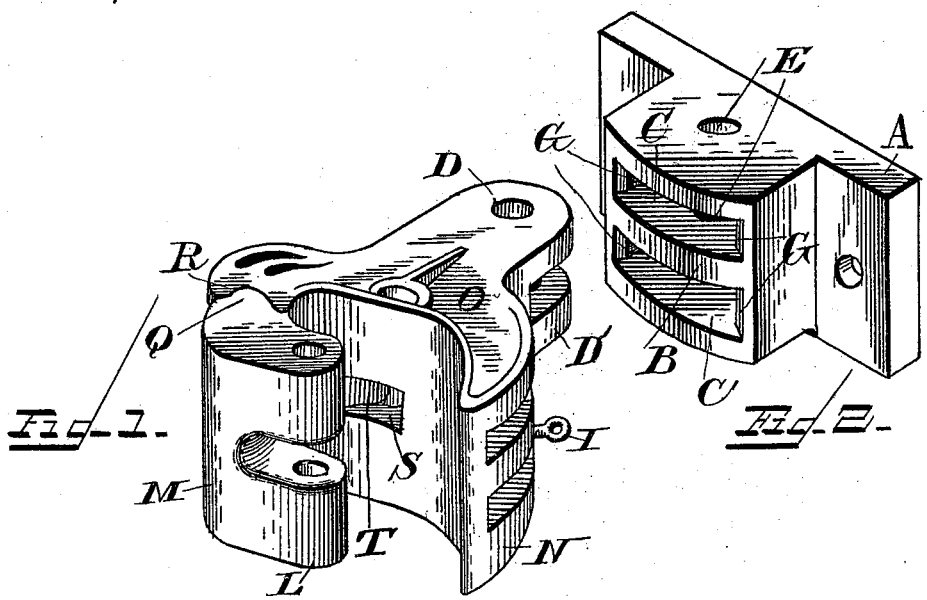
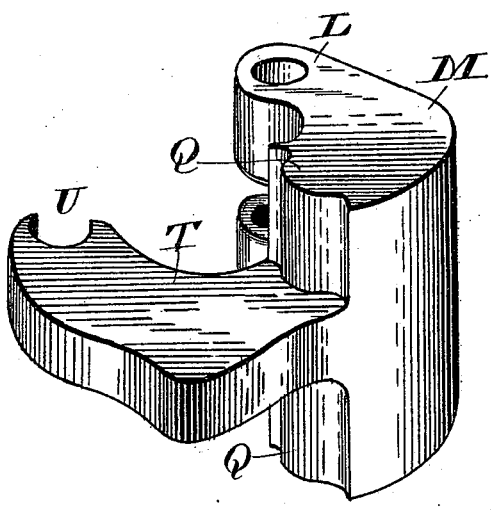
WITNESSES:
F. L. Ourand
Emmett Jones
INVENTOR:
Thomas L. McKeen
by Louis Bagger & Co
Attorneys (No Model.) 2 Sheets—Sheet 2.
T. L. McKEEN.
COUPLING FOR LOCOMOTIVES.
No. 491,903. Patented Feb. 14, 1893.
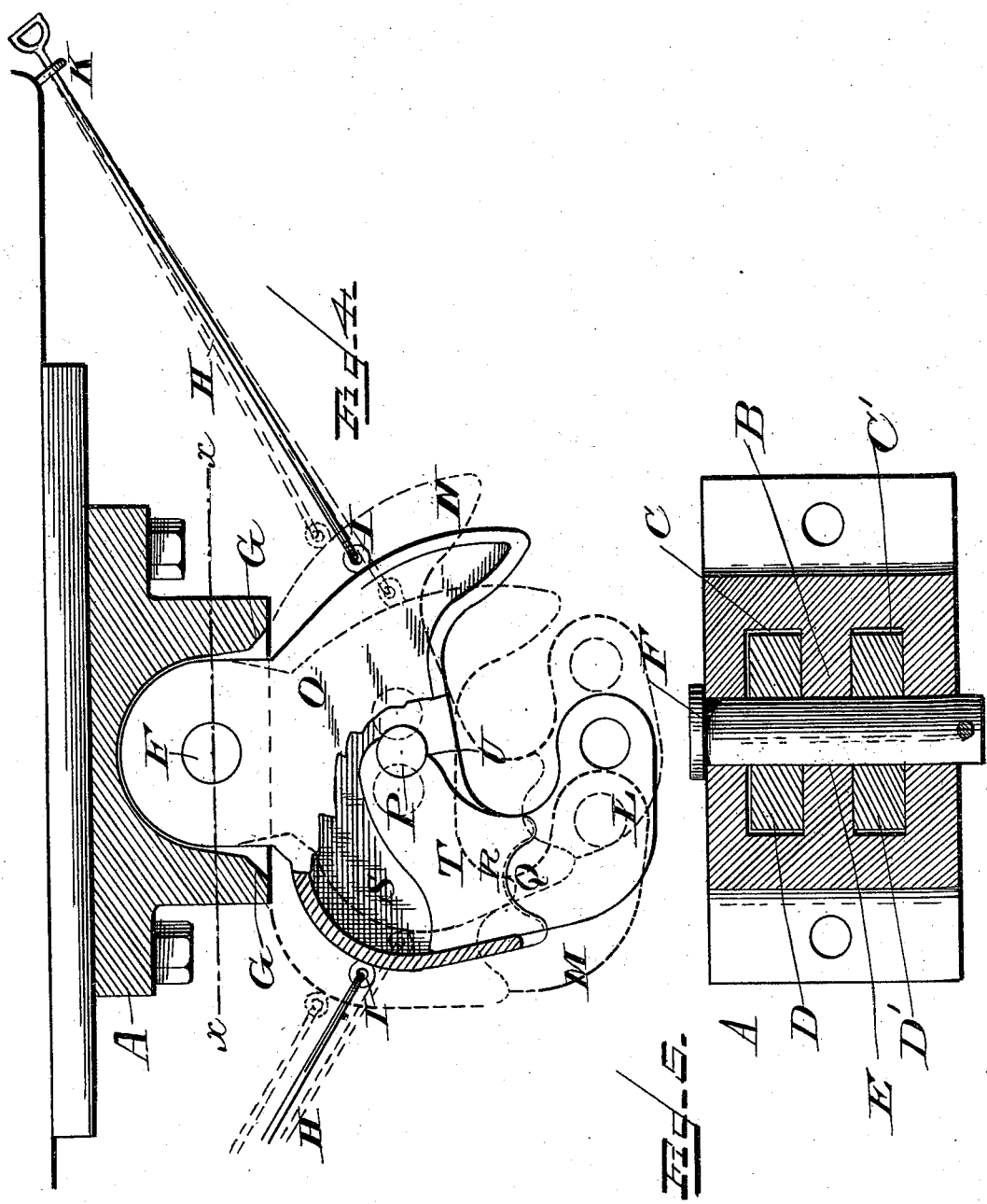
WITNESSES:
INVENTOR:
Thomas L. McKeen
Attorneys.

UNITED STATES PATENT OFFICE.

THOMAS L. McKEEN, OF NEW YORK, N. Y., ASSIGNOR TO ISAAC G. JOHNSON & CO., OF SAME PLACE.

COUPLING FOR LOCOMOTIVES.

SPECIFICATION forming part of Letters Patent No. 491,903, dated February 14, 1893.

Application filed September 26, 1892. Serial No. 446,985. (No model.)

*To all whom it may concern:*

Be it known that I, THOMAS L. McKEEN, a citizen of the United States, and a resident of New York, in the county of New York and State of New York, have invented certain new and useful Improvements in Couplings for Locomotives; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved tender-hook; Fig. 2 is a perspective view of my improved reinforced tender-hook base-plate; Fig. 3 is a perspective detail view of the knuckle, removed from the body of the hook; Fig. 4 is a plan of the tender-hook with parts broken away to show the construction and operative position of the removable knuckle (the base-plate being shown in section); and Fig. 5 is a vertical sectional view through the base-plate and the shank of the hook, on line x—x.

Like letters of reference denote corresponding parts in all the figures.

This invention relates to couplings for locomotives, *i. e.*, locomotive-tender couplers of the "twin-jaw" type, and consists in certain improvements in the tender-hook, in the base-plate for the same, and in the mechanism for operating the hook, as will be hereinafter more fully described and claimed, whereby I greatly increase the durability of the hook and base-plate, and also facilitate the operation of coupling on sharp curves.

Referring to the drawings, the letter A designates the base-plate, the recess of which has a transverse reinforcing web, B, dividing said recess into two parallel sockets, C and C', within which fit loosely the rounded ends D and D' of the bifurcated tender-hook shank; the central reinforcing web, B, projecting between the parts D and D'. This horizontal web B, as well as the upper and under sides of the base-plate socket, is perforated as shown at E, for the insertion of the tender-hook pin F; and the inner edges of the sockets C and C', on opposite sides, are cut off obliquely, so as to form beveled shoulders, G G, which form bearings for the sides of the body of the hook when this is swung to the left or right by means of the lateral adjusting rods H H, in position for coupling on a curve, as indicated by the dotted lines in Fig. 4. By thus forming bearings or abutments for the sides of the hook, these beveled shoulders G G will relieve the pivotal pin F from lateral strain in turning curves.

The angle at which the tender-hook is presented to the coupler opposite may be adjusted, without the necessity of going between the locomotive and tender, by means of the rods H H, of which there are two, one on each side, each of these rods being fastened at one end in an eye-bolt, I, screwed into the opposite sides of the hook, while the other end, which is provided with a suitable handle, slides in a keeper, K, fastened in the corners of the tender, so that these rods may be easily operated by a person standing alongside the tender, enabling him to adjust the position of the tender-hook as indicated in dotted lines, and thus facilitate and expedite the operation of coupling on a curve.

As is well known, in a coupling of this type, the greatest strain comes upon the jaw L which forms the projecting outer part of the knuckle. The left side jaw, or guard-arm N, is subjected to comparatively little strain, but the pulling, as well as buffing, is sustained almost entirely by this jaw L and the knuckle M of which it forms a part. These parts usually give out long before the other parts of the tender-hook are worn out, and instead of casting them in one piece with the rest of the hook, as heretofore, I make the tender-hook in two, or rather three, separate parts, viz: the body proper of the hook, shown at O, which involves the guard-arm N and the shank by which the hook is attached pivotally to the base-plate; a rigid but removable knuckle, M, of which the coupling jaw L forms an integral part, and the lock-pin P. The knuckle M, back of its projecting jaw L, has rounded or convex shoulders, Q, fitting against concave recesses, R, in the adjacent part of the hook body; the reduced inner end or tail, T, of the knuckle fitting into a chamber S, of corresponding shape. Through this chamber passes vertically the lock-pin P, one side of which, within the recess S, fits into a recess, U, cut into the contiguous end of the tail T, so that the pin P locks or fastens the knuckle within its chamber S. I prefer, however, to so shape the convex shoulders Q, and the tail of the knuckle, that this will not be absolutely rigid, but shall have some little play or freedom of movement upon the body of the hook which enables it to yield a little during the act of coupling and uncoupling.

It will be observed that the concave recesses R form a seat or saddle for the convex shoulders Q of the knuckle, relieving the lock-pin P from all thrust and strain when the knuckle operates as a buffer or bumper,—the function of said pin P being simply that of a lock or fastening device for the removable knuckle. By removing the cotter on the under side of this pin and withdrawing the same, the knuckle can be instantly removed, and can be as quickly reinserted and locked in place by the insertion of the locking-pin. Thus it will be seen that whenever the knuckle becomes worn, or if the jaw or any other part of it should break, it may be replaced by a new one in a few moments, at a very much less cost than if an entire new hook had to be furnished.

Having thus described my invention, I claim and desire to secure by Letters-Patent of the United States:

1. The combination, in a tender-hook or coupler, of the chambered hook-body having a guard-arm and shank; the removable knuckle having convex shoulders seated in concave recesses in the hook-body; and the removable locking-pin; substantially as and for the purpose set forth.

2. In a coupler for locomotive tenders, the combination of the socketed base-plate; the tender-hook fastened pivotally therein; and the side-rods or adjusting-rods fastened movably in opposite sides of the hook and extending rearwardly to opposite sides of the tender; substantially as and for the purpose set forth.

3. The combination of the socketed base plate having a central horizontal reinforcing web and beveled shoulders, the tender hook fastened pivotally therein and the adjusting rods fastened movably in opposite sides of the hook and extending rearwardly to opposite sides of the tender, substantially as described.

In testimony that I claim the foregoing as my own I have hereunto affixed my signature in presence of two witnesses.

THOMAS L. McKEEN.

Witnesses:
W. C. JOHNSON,
J. FREDERICK KAPP.